United States Patent [19]
DiMarco et al.

[11] Patent Number: 6,034,581
[45] Date of Patent: Mar. 7, 2000

[54] REMOTE CONTROLLED CIRCUIT BREAKER

[75] Inventors: Bernard DiMarco; David A. Leone, both of Lilburn, Ga.

[73] Assignee: Siemens Energy & Automation, Inc., Alpharetta, Ga.

[21] Appl. No.: 09/107,982

[22] Filed: Jun. 30, 1998

[51] Int. Cl.[7] .................................................. H01N 75/00
[52] U.S. Cl. .................................. 335/16; 335/14; 218/22
[58] Field of Search .................................. 335/6, 16, 147, 335/195, 8–10, 14, 20; 218/22, 30, 31

[56] References Cited

U.S. PATENT DOCUMENTS

| | | |
|---|---|---|
| Re. 32,882 | 3/1989 | Yokoyama et al. . |
| 4,164,719 | 8/1979 | Young et al. ............................... 335/14 |
| 4,278,958 | 7/1981 | Kandatsu ................................... 335/16 |
| 4,292,612 | 9/1981 | Howell . |
| 4,604,596 | 8/1986 | Yokoyama et al. . |
| 4,623,859 | 11/1986 | Erickson et al. . |
| 4,641,117 | 2/1987 | Willard . |
| 4,644,122 | 2/1987 | Farley et al. . |
| 4,725,799 | 2/1988 | Bratkowski et al. . |
| 4,785,145 | 11/1988 | Owens et al. . |
| 4,816,792 | 3/1989 | Belbel et al. . |
| 4,864,261 | 9/1989 | Kandatsu ................................... 335/16 |
| 4,879,535 | 11/1989 | Mori et al. . |
| 4,975,673 | 12/1990 | Ikehata et al. . |
| 5,041,805 | 8/1991 | Ohishi et al. . |
| 5,072,203 | 12/1991 | Heberlein, Jr. et al. ................ 335/195 |
| 5,079,529 | 1/1992 | Ohishi et al. . |
| 5,180,051 | 1/1993 | Cook et al. . |
| 5,184,278 | 2/1993 | Jordan et al. . |
| 5,193,666 | 3/1993 | Markowski et al. . |
| 5,270,505 | 12/1993 | Magiera . |
| 5,276,420 | 1/1994 | Dufrene et al. . |
| 5,301,083 | 4/1994 | Grass et al. . |
| 5,302,786 | 4/1994 | Rosen et al. . |
| 5,331,301 | 7/1994 | Glennon et al. .......................... 335/20 |
| 5,459,631 | 10/1995 | Leone et al. . |
| 5,477,016 | 12/1995 | Baginski et al. . |
| 5,504,284 | 4/1996 | Lazareth et al. . |
| 5,504,290 | 4/1996 | Baginski et al. . |
| 5,532,660 | 7/1996 | Smith et al. . |
| 5,534,833 | 7/1996 | Castonguay et al. . |
| 5,614,878 | 3/1997 | Patrick et al. . |

*Primary Examiner*—Lincoln Donovan

[57] ABSTRACT

A contact assembly (22) is adapted for use with a circuit breaker (12) that is set to open a circuit above a predetermined current load. The contact assembly (22) is adapted to reciprocate between a closed position to permit the flow of current through the circuit and an open position to prevent the flow of current. The contact assembly (22) is further adapted to resist unintended reciprocation from the closed position to the open position at current loads up to or exceeding the predetermined current load. The contact assembly includes a line side conductor (38) and a load side conductor (54). When in the closed position, a surface (42) of the line side conductor (38) extends proximal to a surface (56) of the load side conductor (54) and current flows in substantially the same direction along the line side and load side surfaces (42 and 56) to generate an electromagnetic attraction between the conductors (38 and 54) in order to resist unintended reciprocation of the contact assembly (22) from the closed position to the open position due to inherent repulsion forces present across the contact points (contact constriction forces). A circuit breaker assembly (10) and an automated control system (300) are also described.

20 Claims, 5 Drawing Sheets

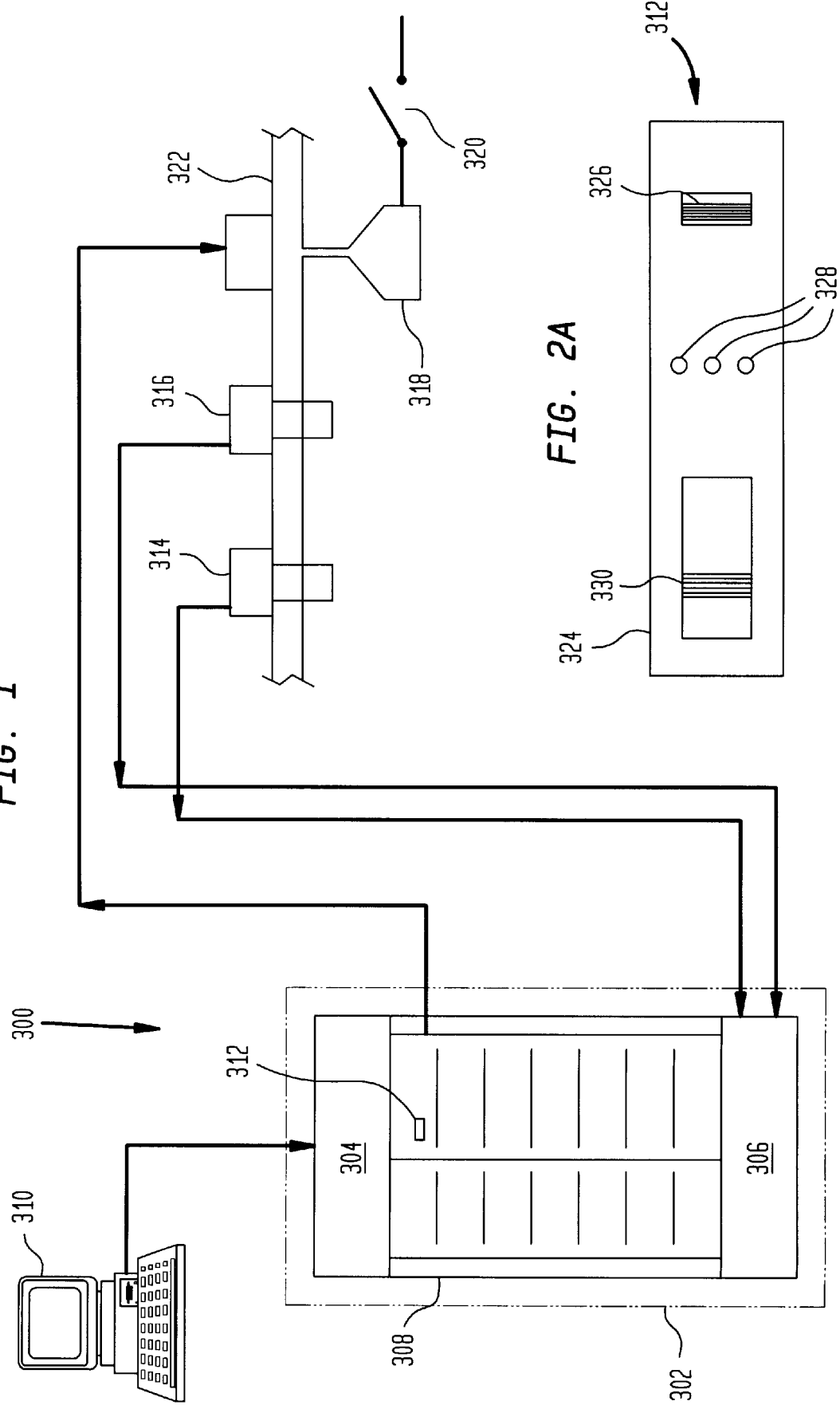

REMOTE CONTROLLED CIRCUIT BREAKER

FIELD OF THE INVENTION

This invention relates generally to aspects of an improved circuit breaker assembly and, more particularly, to aspects of an improved remote controlled circuit breaker.

BACKGROUND OF THE INVENTION

There has been an increasing demand for remotely controllable circuit breakers that can reciprocate between an open circuit and a closed circuit in response to a remotely generated command. One advantageous application for such circuit breakers is in the control panelboards that are used for automated control systems such as automated lighting systems. Automated lighting systems have been developed for the control of lighting circuits based upon inputs such as the time-of-day, wall switches, occupancy sensors and/or control from a power distribution system. Lighting control systems offer an opportunity to save energy by automating the process of cutting back on the number of lighting fixtures that are illuminated, or by cutting out artificial lighting altogether when circumstances warrant. For example, ambient light sensors can be used to control lighting circuits in response to ambient light levels. The sensors can serve both switching and automatic dimming functions that can adjust the output of the lighting system continually in response to the amount of daylight striking the ambient light sensor. Occupancy sensors can be used to activate lighting when someone is in a space and to deactivate the lighting, perhaps after a set time interval, when a person is no longer detected in the space. Using such a system, occupants no longer have to remember to turn the lights off when leaving the space.

Automated control systems can require a remotely controllable circuit breaker, and such circuit breakers should have a low cost and should be of high reliability. Accordingly, it is an object of this invention to provide a low cost and high reliability remotely controllable circuit breaker.

SUMMARY OF THE INVENTION

This invention provides a contact assembly that is adapted for use with a circuit breaker that is set to open a circuit above a predetermined current load. The contact assembly is adapted to reciprocate between a closed position (to permit the flow of current through the contact assembly) and an open position (to prevent the flow of current through the contact assembly). The contact assembly is further adapted to resist unintended reciprocation from its closed position to its open position even when current loads approach or exceed the predetermined current load at which the circuit breaker is set to open in a fault condition.

The contact assembly includes a line side conductor and a load side conductor, wherein at least one of the conductors is movable with respect to the other in order to permit reciprocation between the contact assembly's closed and open positions. When in the closed position, a surface of the line side conductor extends adjacent to a surface of the load side conductor with a small space therebetween. The current flows in substantially the same direction along the surfaces of the conductors, thereby generating electromagnetic attraction between the conductors. This electromagnetic attraction resists any unintended reciprocation of the contact assembly from its closed position to its open position during normal operation and at currents approaching and exceeding the predetermined current load at which the circuit breaker is set to open.

One of the conductors of the contact assembly can include an additional surface portion that extends adjacent to the other conductor, wherein the additional conductor surface portion is oriented so that current flows in substantially opposite directions along the additional surface portion and the other conductor. The added surface portion generates an electromagnetic repulsion that further helps to urge the conductors toward one another in order to maintain the contact assembly in the closed position, when desired.

The contact assembly can be a part of a circuit breaker assembly. For example, if the contact assembly is positioned on the load side of a circuit breaker as a part of a circuit breaker assembly, then the contact assembly opens and closes the circuit during normal operation yet prevents unintended opening of the circuit between the load and the circuit breaker so that the circuit is only broken by the circuit breaker if a load above the predetermined load occurs (i.e., a fault condition). In turn, a circuit breaker assembly including the contact assembly can be part of an automated control system that can be used, for example, for the automated control of lighting.

BRIEF DESCRIPTION OF THE DRAWINGS

FIG. 1 shows a schematic view of an embodiment of an automated control system embodying features of this invention.

FIG. 2A shows a top view of an embodiment of a circuit breaker assembly according to this invention.

DETAILED DESCRIPTION OF THE INVENTION

Figure 2B:
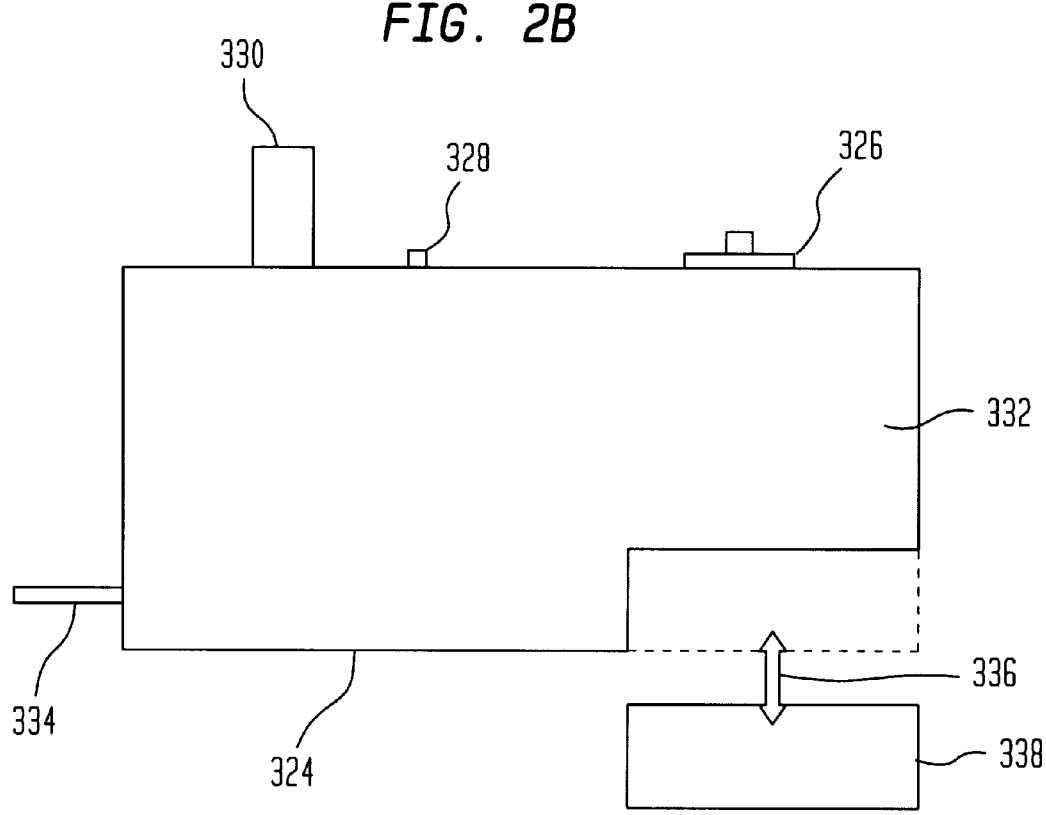
FIG. 2B shows a side view of the circuit breaker assembly shown in FIG. 2A.

The invention will now be described with reference to specific embodiments selected for illustration in the drawings. It will be appreciated that the invention is not limited in spirit or scope to the embodiments illustrated and described below. Also, it will be appreciated that the drawings are not to scale or to proportion. The scope of the invention is defined separately in the appended claims.

The contact assembly and circuit breaker assembly of this invention are described with reference to an automated control system such as an automated lighting system that is used to control the actuation of light sources and to reduce the energy costs associated with such lighting. Nevertheless, it will be appreciated that the contact assembly of this invention can be used in a wide variety of applications and is not limited in its use to circuit breaker assemblies or to automated control systems, which are described herein for purposes of illustration only.

Generally speaking, an exemplary embodiment of this invention provides an add-on pod that is attachable directly to the load end of a conventional circuit breaker such as a 1-, 2-, or 3-pole circuit breaker. The exemplary add-on includes a contact assembly with a solenoid operator, a force magnifying toggle arrangement and a set of so-called "blow-on" contact arms capable of holding the contacts closed during a fault.

The contact arms include moveable and stationary arms in such arrangement with respect to one another as to result in a current flow tending to attract the arms together, therefore counteracting the effects of the contact constriction forces that would otherwise cause the contacts to separate during a fault.

Referring to FIG. 1, an embodiment of an automatic lighting control system embodying features of this invention is designated by the numeral "300." It includes a panelboard 302 having an on-off control 304 that is adapted to turn light sources on or off and a dimmer control 306 that is adapted to change the intensity of the light supplied by the light sources. A communication bus 308 is provided for electrical communications between the various components of panelboard 302 in a manner known in the art.

An input device such as personal computer 310 is connected to panelboard 302 so that various parameters of the automated lighting control system 300 can be entered. Mounted within panelboard 302 is a remote controlled circuit breaker assembly 312, details of which will be described later with reference to FIGS. 2A and 2B, and elsewhere.

An occupancy sensor 314 is connected to panelboard 302. Various types of occupancy sensors can be selected. For example, motion detection sensors utilizing technologies such as ultrasonics can be used. Also, body heat sensors such as passive infrared sensors can be used as well. Noise sensors using acoustic devices and beam interruption sensors using active infrared components can be utilized as well. Ultrasonic sensors and passive infrared sensors are preferred, but panelboard 302 is adapted to accommodate inputs from various sensor types.

A lamp bay 318 is connected to receive signals from the panelboard 302 by means of remote controlled circuit breaker assembly 312. Accordingly, occupancy sensor 314 and ambient light sensor 316 provide input signals to panelboard 302 via the dimmer control 306. Also, output signals from panelboard 302 are delivered to lamp bay 318 via remote control circuit breaker assembly 312.

A manual override wall switch 320 is connected to lamp bay 318 so that the automated lighting control system 300 can be superseded by local manual switching. As is shown schematically, occupancy sensor 314, ambient light sensor 316, and lamp bay 318 are all mounted at the ceiling 322, although a wall or other mounting is alternatively provided.

Referring now to FIGS. 2A and 2B for external details of remote control circuit breaker assembly 312, a top view of the circuit breaker escutcheon is illustrated (FIG. 2A) as is a side view (FIG. 2B). Remote controlled circuit breaker assembly 312 includes a housing 324 that is substantially rectangular but can of course take a wide variety of shapes or configurations. A manual override switch 326 is provided as are a series of three LEDs 328 which provide a visible indication as to whether the circuit breaker assembly 312 is in the "on" or "off" position. A circuit breaker handle 330 is provided in the usual manner.

Within remote controlled circuit breaker assembly 312 is an electrical contact 334 provided for electrical connection (i.e., to the panelboard 302) and a communications bus 336 provided for electrical communication to an input device 338 such as an occupancy sensor, a time controller, and/or an ambient light sensor.

Remote controlled circuit breaker assembly 312 is adapted to break the circuit between the line (such as a power source) and the load (such as a lighting source) under fault conditions. When a fault condition arises such as a system short circuit or a system overload, the circuit breaker is adapted to open the circuit immediately to prevent damage to connecting cables and to connected components such as the lighting source, etc. Remote controlled circuit breaker assembly 312 is also adapted to open and close the circuit between the line and the load in order to control a device such as lamp bay 318 during normal operation to activate and deactivate the device. Control commands are provided remotely from a separate input device such as computer 310.

It has been discovered that a great benefit is conferred by providing a separate contact assembly within or adjacent to the circuit breaker to facilitate the remote control. The circuit breaker itself opens the circuit in case of a fault condition. The contact assembly opens and closes the circuit under normal operating conditions. If the circuit breaker provides interrupting functions for system overload and short circuit conditions, it will be provided with an arc chamber sufficient in size to rapidly extinguish the arc that occurs when the circuit breaker's contacts are separated. However, the contact assembly is smaller in size and, therefore, may not be able to accommodate a large enough arc chamber to dissipate an arc upon breaking the circuit during an overload or short circuit condition.

The remotely controlled contact assembly opens and closes the circuit based on a remotely provided command. Such opening and closing of the circuit constitutes intended changes of the circuit's condition. Unintended opening of the remotely controlled contact assembly is desirably avoided.

Figure 3:
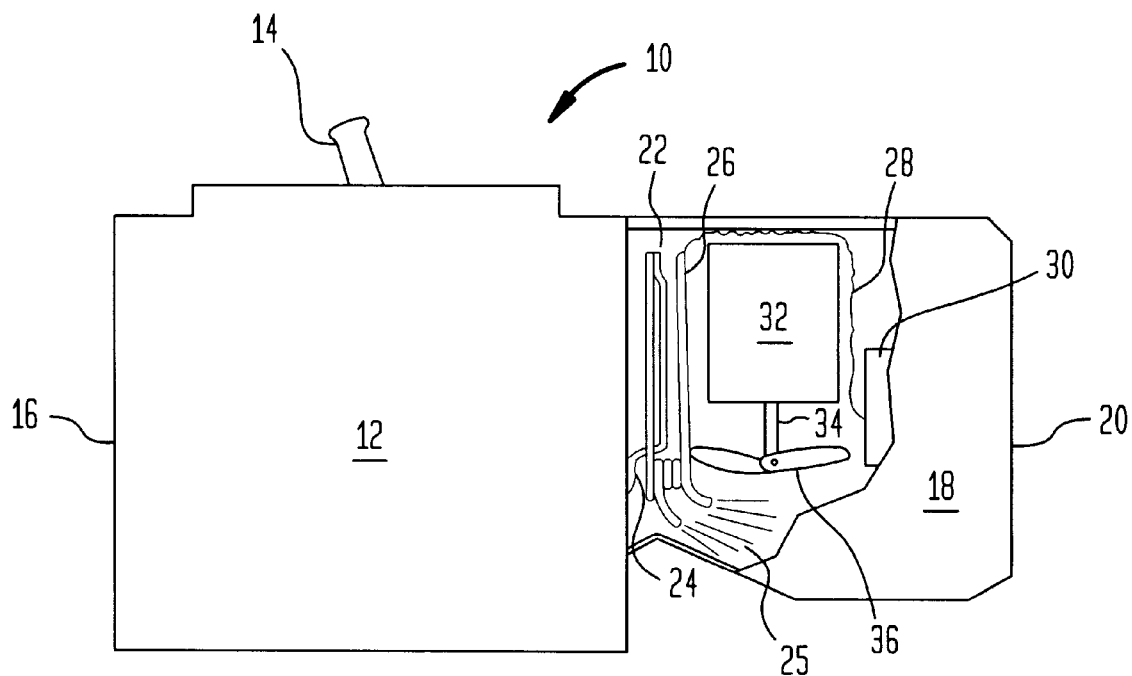
FIG. 3 shows a side view of another embodiment of a circuit breaker assembly according to this invention.

Referring now to FIGS. 3 through 10, details of exemplary embodiments of a contact assembly according to this invention will now be described. A circuit breaker assembly 10 is shown in FIG. 3 with portions of the housing of the contact assembly portion removed to reveal details of the invention. Circuit breaker assembly 10 includes a circuit breaker portion 12, which can be a standard circuit breaker such as those provided under the trademarks BQD or CQD by Siemens Corporation of Iselin, N.J. Other equivalent circuit breakers can be substituted. As discussed previously, circuit breaker portion 12 includes an operating mechanism to break the circuit when an overload or short circuit condition arises in the system. Circuit breaker portion 12 includes a control member such as a handle 14 and is enclosed by a circuit breaker housing 16.

A remotely controlled contact assembly portion is generally designated by the numeral "18." It includes a housing 20 within which is mounted a contact assembly 22, further details of which will be provided later with reference to FIGS. 4–10. Contact assembly 22 has a conductor end portion 24 that is positioned for electrical connection to the circuit breaker portion 12 and an opposite conductor end portion at 26 that is connected by means of a flexible conductor, such as a pigtail 28, to load lugs 30.

A solenoid 32 is also mounted within housing 20 of remotely controlled contact assembly portion 18. The solenoid 32 is connected by means of an armature 34 to a pivotal linkage 36, which in tarn is connected to a portion of contact assembly 22. Solenoid 32, which is remotely controlled, advances or retracts armature 34 in order to change the position of pivotal linkage 36. By this action, pivotal linkage 36 opens and closes contact assembly 22 to reciprocate contact assembly 22 between an open position and the closed position shown in FIG. 3. A small arc chamber 25 is provided adjacent to contact assembly 22 in order to extinguish arcs that can be generated when the contact assembly is alternated from the closed position to an open position.

Circuit breaker portion 12 and remotely controlled contact assembly portion 18 of circuit breaker assembly 10 are connected adjacent one another between a load and line source. Remotely controlled contact assembly portion 18 is positioned on the load side of circuit breaker 12 in this embodiment in order to open and close the circuit between the load and the circuit breaker portion 12. Under normal operating conditions, remotely controlled contact assembly portion 18 alternates between the open and closed positions, when intended, in response to an external command. Remotely controlled contact assembly portion 18 is also adapted to resist unintended opening of the circuit during fault conditions up to and beyond the point at which circuit breaker portion 12 is set to open.

Figure 4:
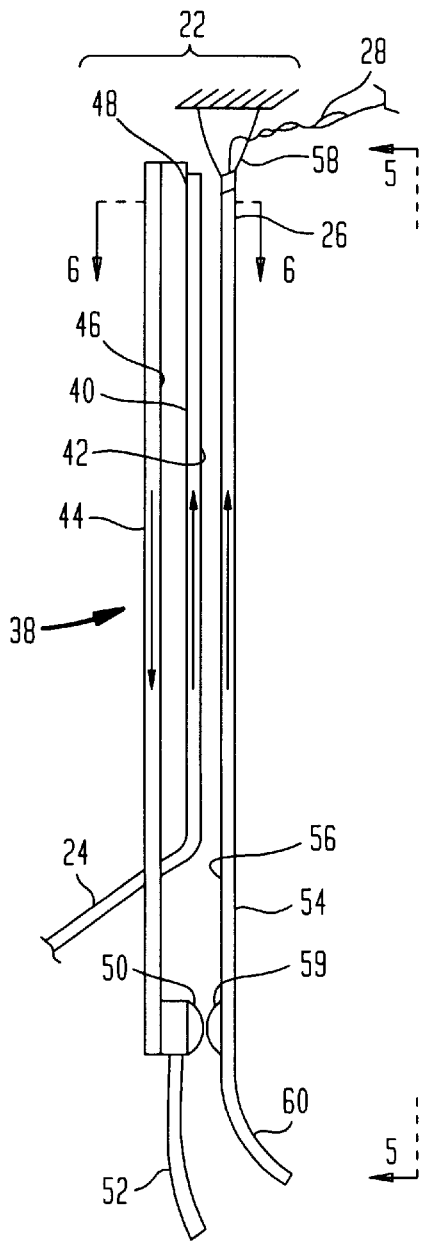
FIG. 4 shows a side view of an embodiment of a contact assembly according to this invention.
Figure 5:
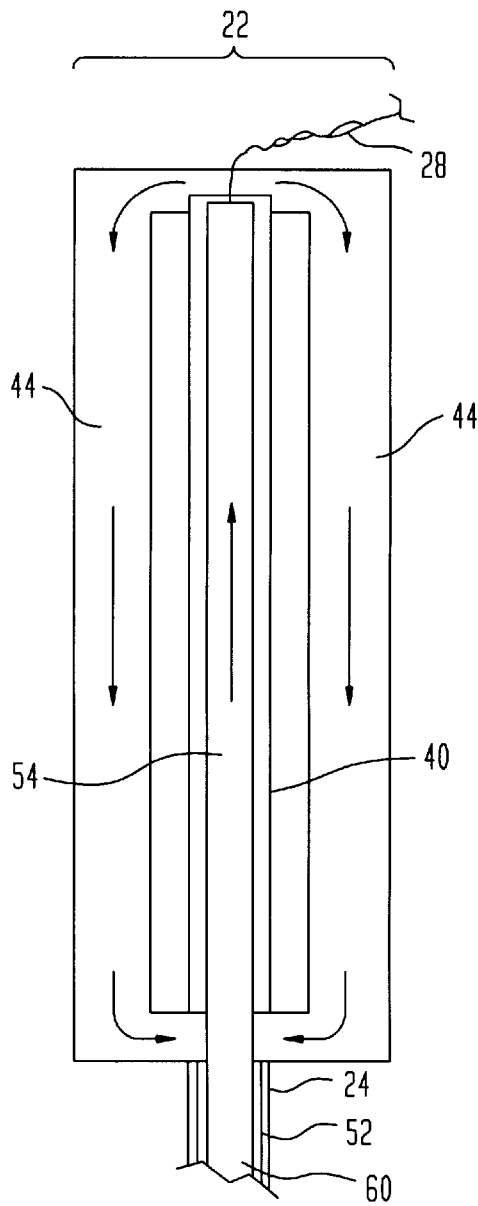
FIG. 5 shows a front view of the contact assembly shown in FIG. 4.
Figure 6:
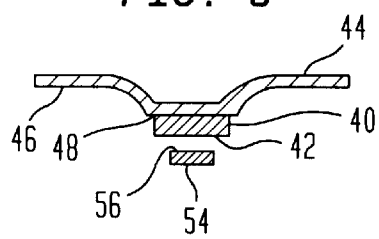
FIG. 6 shows an end view of the contact assembly shown in FIGS. 4 and 5.

FIGS. 4–6 illustrate an exemplary embodiment of contact assembly 22. As shown in FIG. 4, which is a side view of contact assembly 22, contact assembly 22 includes a line side conductor 38 having a first arm or portion 40 that is an extension of conductor end portion 24. First portion 40 of line side conductor 38 has a longitudinally extending, flat surface 42 which is also illustrated in the end view of FIG. 6. Line side conductor 38 also includes a second arm or portion 44 which also has a longitudinally extending, flat surface 46, also shown in FIG. 6. A rigid electrical and mechanical connection 48 is provided between first portion 40 and second portion 44 of line side conductor 38. A weld or any other mechanical fastener (e.g., threaded fasteners, clamps, etc.) can be used to provide rigid connection 48. Alternatively, portions 40 and 44 are formed from a single piece of material that can be bent into the configuration shown in FIG. 4. One exemplary shape for second portion 44 is most clearly illustrated in FIGS. 5 and 6. It has a generally rectangular shape as shown in FIG. 5 and the short crossing legs at the upper and lower ends of second portion 44 can be bent as shown in FIG. 6 to facilitate the rigid connection 48 to the first portion 40 with an appropriate relative position between portions 40 and 44. Portions 40 and 44 are positioned in different planes in this embodiment.

A line side contact 50 is provided on second portion 44 of line side conductor 38. An arc horn 52 extends outwardly from second portion 44 of line side conductor 38 adjacent to line side contact 50 (downwardly as shown in FIG. 4). The arc horn 52 facilitates the release of any generated arcs.

Contact assembly 22 also includes a load side conductor 54 having a longitudinally extending, flat surface 56 that extends closely adjacent to (and substantially parallel to) longitudinally extending flat surface 42 of the first portion 40 of the line side conductor 38. As shown near the top of FIG. 4, a pivotal mount 58 is provided adjacent to the conductor end portion 26 of the load side conductor 54. It is this pivotal mount 58 that facilitates pivotal movement of load side conductor 54 with respect to line side conductor 38.

Load side conductor 54 is also provided with a load side contact 59 that is positioned for electrical contact with line side contact 50 of line side conductor 38. An arc horn 60 is provided adjacent to load side contact 59 in order to release arcs generated when the contact assembly moves from the closed position to the open position.

Pivotal mount 58 facilitates pivotal movement of load side conductor 54 with respect to line side conductor 38. More specifically, pivotal mount 58 permits movement of load side contact 59 away from or toward line side contact 50. Although not shown, it will be understood that pivotal linkage 36 is connected to load side conductor 54 at a location proximal to load side contact 59 (but on the opposite side) in order to facilitate rotational movement of load side conductor 54 about the axis defined by pivotal mount 58.

In FIG. 5, first portion 40 of line side conductor 38 is illustrated as being wider than arc horn 52, which is in turn shown to be wider than arc horn 60 and load side conductor 54, merely for purposes of clarification in the figures. The relative widths of those components can be adjusted according to the manufacturer's preference.

The arrows provided in FIGS. 4 and 5 illustrate relative current flow directions at any instant of time. When contact assembly 22 is in the closed position as illustrated in FIG. 4, current flows from the circuit breaker 12, through conductor end portion 24, upwardly through first portion 40 of line side conductor 38, through rigid connection 48, and downwardly through second portion 44 of line side conductor 38 before it reaches line side contact 50. When the contact assembly is closed as shown, current then flows upwardly from load side contact 59 through load side conductor 54 before it travels along the flexible pigtail conductor 28 toward the load lugs (not shown). FIG. 5 illustrates the manner in which the current flows through the second portion 44 of line side conductor 38 toward line side contact 50.

As is well known in the art, current traveling along adjacent conductors in the same direction tends to attract the conductors toward one another by the generation of electromagnetic forces. In contrast, current flowing in opposite directions through conductors adjacent one another tends to generate repulsive electromagnetic forces. Electromagnetic attraction occurs between surface 42 of line side conductor 38 and surface 56 of load side conductor 54. It is this electromagnetic attraction that urges the conductor portions 38 and 54 toward one another and resists the unintended opening of contact assembly 22 during fault conditions when the current flow could otherwise urge the contact assembly to open due to repulsion forces at the contact points. This resistance to opening can be considered a "blow-on" feature because it maintains the closed position even when the load across the contact assembly exceeds the normal operation load. The close proximity of surfaces 42 and 56 is also clearly shown in FIG. 6.

Even when the current flow exceeds nominal operating conditions, contact assembly 22 will resist unintended opening and as the load increases, more electromagnetic forces will be generated to hold the circuit in a closed position. Contact assembly 22 acts in an opposite manner from so-called "blow-off" circuit breakers because it actually holds the conductors and the contacts 50 and 59 against one another.

Figure 8:
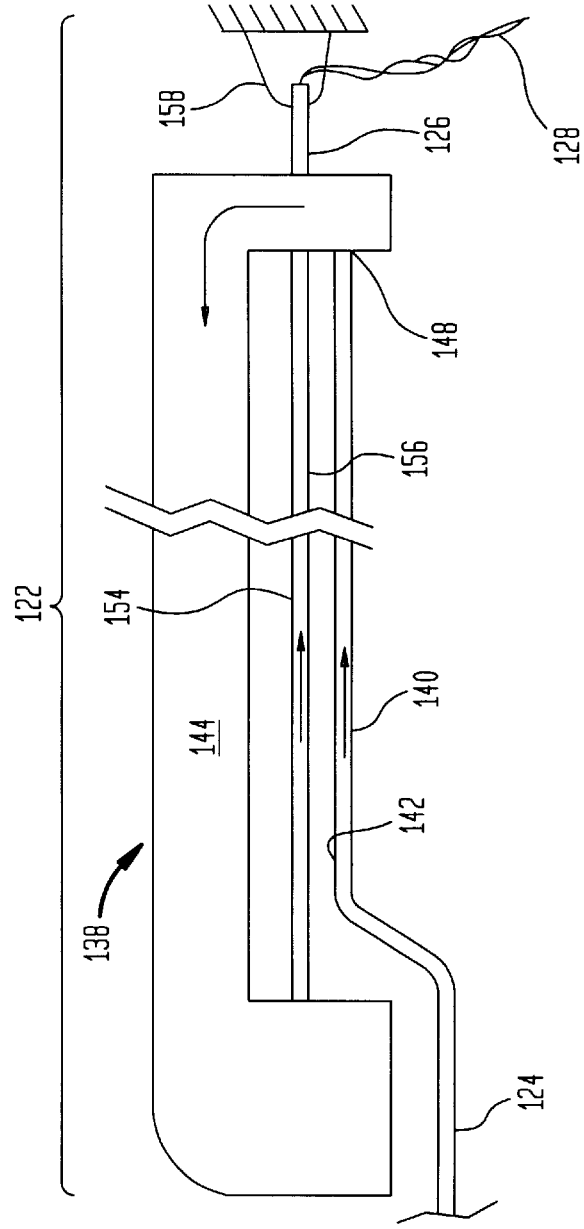
FIG. 8 shows a side view of the contact assembly shown in FIG. 7.
Figure 7:
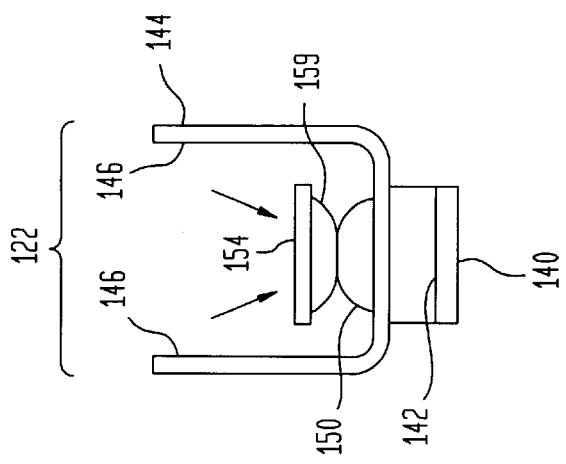
FIG. 7 shows an end view of another embodiment of a contact assembly according to this invention.

Referring now to FIGS. 7 and 8, another exemplary embodiment of a contact assembly according to this invention is illustrated. The contact assembly 122 is similar to contact assembly 22 in that it also includes a conductor end portion 124 for connection to a circuit breaker such as circuit breaker 12, as well as a conductor end portion 126 for connection by means of a flexible pigtail conductor 128 to load lugs (not shown). It also includes a line side conductor 138 having a first arm or portion 140 with a longitudinally extending flat surface 142. A second arm or portion 144, having a longitudinally extending flat surface 146, is connected to first portion 140 by means of a rigid electrical and mechanical connection at 148. A line side contact 150 is provided on second portion 144 of line side conductor 138 as is best illustrated in FIG. 7.

Contact assembly 122 also includes a load side conductor 154 having a longitudinally extending, flat surface 156. A pivotal mount 158 is attached adjacent to conductor end portion 126 of load side conductor 154 in order to facilitate movement of line side contact 150 with respect to a load side contact 159 that is positioned on load side conductor 154.

The arrows illustrate one possible flow of current through contact assembly 122. Specifically, current can flow from a circuit breaker such as circuit breaker 12 through conductor end portion 124, first portion 140 of line side conductor 138, second portion 144 of line side conductor 138, through contacts 150 and 159, and along load side conductor 154 and out through pigtail conductor 128 to load lugs (not shown). As with contact assembly 22, an attractive electromagnetic force is generated between surface 142 and surface 156 in order to urge and maintain contacts 159 and 150 against one another in a closed position. In addition, a repulsive force is generated between surface 146 and the top surface of load side conductor 154 as is indicated in FIG. 7 by the arrows extending from surface 146 toward conductor 154. This additional force still further holds contacts 150 and 159 adjacent one another while contact assembly 122 is in the closed position to avoid or resist unintended separation.

Figure 10:
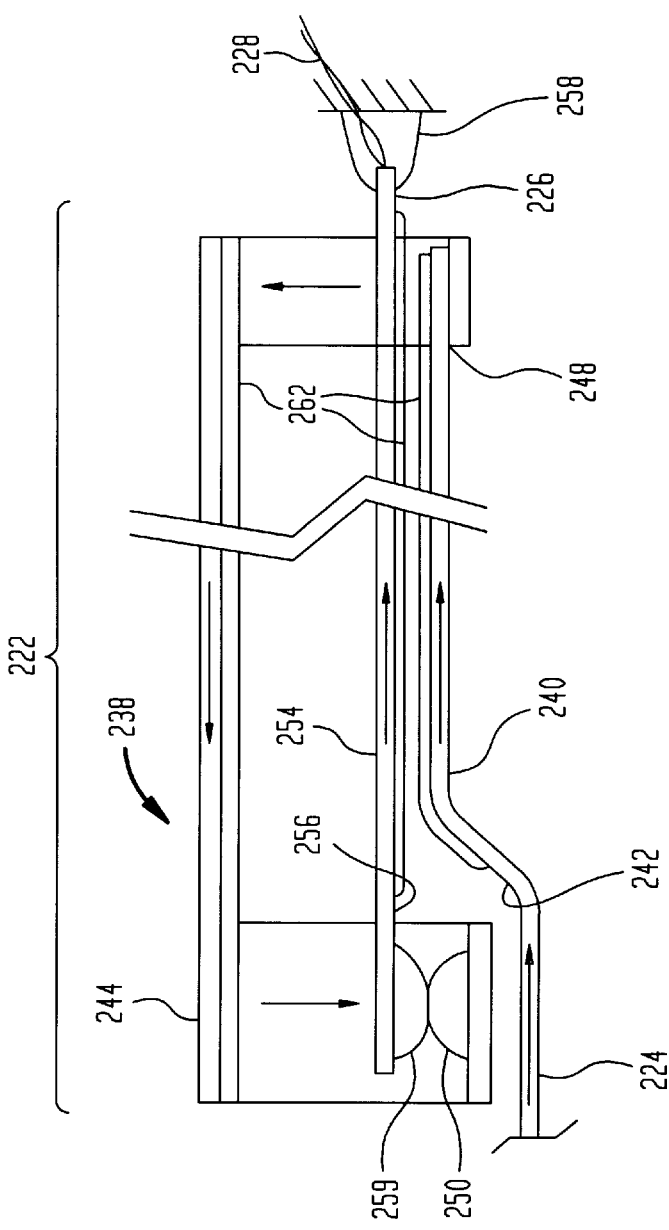
FIG. 10 shows a side view of the contact assembly shown in FIG. 9.
Figure 9:
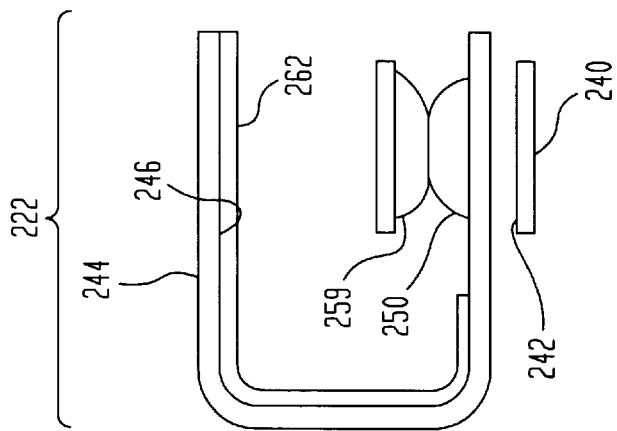
FIG. 9 shows an end view of yet another embodiment of a contact assembly according to this invention.

Yet another embodiment of a contact assembly according to this invention is illustrated in FIGS. 9 and 10, generally designated by the numeral "222." Contact assembly 222 also includes a conductor end portion 224 and a conductor end portion 226 as well as a pigtail conductor 228. A line side conductor 238 has a first arm or portion 240 with a longitudinally extending flat surface 242. It also has a second arm or portion 244, also having a longitudinally extending, flat surface 246. The two portions 240 and 244 are connected by means of a rigid electrical and mechanical connection 248. A line side contact 250 is connected to the line side conductor 238.

A load side conductor 254 has a longitudinally extending, flat surface 256 and is mounted by means of a pivotal mount at 258. A load side contact 259 is connected to load side conductor 254 as well.

Once again, arrows indicate one possible flow direction of current through contact assembly 222. Electromagnetic attraction is generated between surfaces 242 and 256 in order to maintain the contact assembly in the closed position, when desired, to avoid unintended opening of the circuit. A direct repulsive electromagnetic force is also generated between surface 246 and the top surface of load side conductor 254 in order to further urge the contacts 250 and 259 to remain in the closed position.

The configuration of contact assembly 222 is advantageous when greater "blow-on" forces are required to hold the contact assembly 222 in the closed position during fault conditions. Contact assembly 222 provides a larger amount of electromagnetic force to bias the contact assembly in the closed position because of the combined attraction between surfaces 242 and 256 and repulsion between surface 246 and conductor 254, wherein the attraction and repulsion cooperate to resist unintended circuit opening. The electromagnetic force generated by contact assembly 222 is expected to be greater than that generated by contact assembly 122 which, in turn, is expected to be greater than that generated by contact assembly 22, for the same load.

Insulation 262 is provided on surfaces 242, 256, and 246 in order to prevent electrical contact between the load side and line side conductors. Such insulation may be beneficial in contact assemblies 22 and 122 as well. Although conductors 238 and 254 can be formed from rigid material with a thickness or diameter selected to reduce or eliminate bending, the electromagnetic forces generated (especially at higher loads) may cause some bending of the conductors. Insulation 262 is positioned to prevent an electrical short circuit between the conductors in the event of excessive bending. Electrical contact is therefore only possible at load side contact 259 and line side contact 250.

The conductors selected for use in the contact assembly according to this invention are preferably rigid copper conductors that resist bending. It is of course contemplated that other rigid materials, or even semi-rigid materials can be selected.

Although this invention has been described with reference to specific embodiments selected for illustration in the drawings, it will be appreciated that many modifications can be made without departing from the spirit or scope of the invention. Specifically, the materials described can be substituted for equivalent materials and the various components can be substituted for equivalent components. Also, aspects of the invention that are described in terms of an assembly can be replaced by a single component, where desired, and single component portions of the invention can be substituted with multiple components, if desired.

It will be appreciated that the contact assembly described and illustrated in the drawings can be used in a wide variety of applications, not just with remotely controlled contact assemblies. Also the remotely controlled contact assembly described herein can be used in a wide variety of applications and not just in connection with a circuit breaker assembly. Furthermore, the circuit breaker assembly described herein can be used in a wide variety of applications and need not be limited to uses such as in automated control systems.

The contact assembly portion 18 of circuit breaker assembly 10 can be provided in the form of an add-on pod in a separate housing or, alternatively, it can be provided within a common housing with circuit breaker portion 12. Also, the shape and configuration of the conductors can be modified to meet the requirements of various applications. The size of the conductors can be made larger or smaller. The surfaces of the conductors need not be flat and the conductors can have rounded or other cross-sectional shapes. The insulation 262 (FIGS. 9 and 10) can be formed from a variety of materials known in the art, and continuous insulation surfaces can be replaced with one or more insulating spacers.

The solenoid, armature and linkage assembly (FIG. 3) can be replaced with equivalent means for causing the contact assembly to reciprocate between the open and closed positions. Various motors, switches, and other components can be substituted if desired. A remotely controllable assembly is advantageous.

Other variations and modifications of the illustrated embodiments are within the scope of the invention, which is defined separately in the appended claims.

What is claimed is:

1. A contact assembly adapted to reciprocate between a closed position to permit the flow of current across the contact assembly and an open position to prevent the flow of current across the contact assembly, said contact assembly being further adapted to resist unintended reciprocation from said closed position to said open position, said contact assembly comprising:

a line side conductor having a line side contact; and a load side conductor having a load side contact;

at least one of said conductors being moveable with respect to the other for reciprocation between said closed position with said line side contact contacting said load side contact and said open position with said line side contact spaced from said load side contact, wherein in said closed position a surface of said line side conductor extends proximal to a surface of said load side conductor, and wherein said current flows in substantially the same direction along said surfaces of said line side conductor and said load side conductor, wherein said surfaces are those which extend proximal to each other in said closed position, to generate an electromagnetic attraction between said surfaces, said electromagnetic attraction generated between said surfaces being capable of resisting said unintended reciprocation of said contact assembly from said closed position to said open position.

2. The contact assembly defined in claim 1, at least one of said conductors further comprising a surface, extending proximal to the other one of said conductors in said closed position, along which current flows in a substantially opposite direction, said surface being oriented to generate an electromagnetic repulsion between said conductors sufficient to further resist said unintended reciprocation from said closed position to said open position.

3. The contact assembly defined in claim 1, wherein at least one of said conductors is pivotally mounted to permit reciprocation between said open and closed positions.

4. The contact assembly defined in claim 1, further comprising a solenoid connected to at least one of said conductors to reciprocate said conductors between said open and said closed positions.

5. The contact assembly defined in claim 4, wherein said solenoid is remotely controllable.

6. The contact assembly defined in claim 1, wherein said surfaces of said conductors are substantially flat.

7. The contact assembly defined in claim 1, wherein said conductors are substantially rigid.

8. The contact assembly defined in claim 1, wherein at least one of said conductors comprises an arc horn positioned to release an arc when said contact assembly reciprocates from said closed position to said open position.

9. The contact assembly defined in claim 1, wherein said surfaces of said conductors are substantially parallel to one another when said contact assembly is in said closed position.

10. The contact assembly defined in claim 1, wherein insulation is positioned adjacent to said surface of at least one of said conductors to prevent direct electrical contact between said surfaces.

11. A circuit breaker assembly positionable in a circuit between a line and a load, said circuit breaker assembly comprising:

a circuit breaker set to open the circuit between said line and said load at or above a predetermined current load; and a contact assembly connected to said circuit breaker, said contact assembly being adapted to reciprocate between a closed position to permit the flow of current through the circuit and an open position to prevent the flow of current through the circuit, said contact assembly being further adapted to resist unintended reciprocation from said closed position to said open position at current loads up to at least said predetermined current load, said contact assembly comprising a line side conductor having a line side contact, said contact assembly also comprising a load side conductor having a load side contact, at least one of said conductors being moveable with respect to the other for reciprocation between said closed position with said line side contact contacting said load side contact and said open position with said line side contact spaced from said load side contact, wherein in said closed position a surface of said line side conductor extends proximal to a surface of said load side conductor, and wherein said current flows in substantially the same direction along said surfaces of said line side conductor and said load side conductor, wherein said surfaces are those which extend proximal to each other in said closed position, to generate an electromagnetic attraction between said surfaces, said electromagnetic attraction generated between said surfaces being capable of resisting said unintended reciprocation of said contact assembly from said closed position to said open position.

12. The circuit breaker assembly defined in claim 11, wherein said contact assembly is positioned on the load side of said circuit breaker to prevent unintended opening of the circuit between said load and said circuit breaker.

13. The circuit breaker assembly defined in claim 11, further comprising a housing, wherein said contact assembly and said circuit breaker are positioned within said housing.

14. The circuit breaker assembly defined in claim 11, wherein said contact assembly and said circuit breaker are positioned in separate housings.

15. The circuit breaker assembly defined in claim 11, further comprising remotely controllable means for reciprocating said contact assembly between said closed position and said open position.

16. The circuit breaker assembly defined in claim 15, said remotely controllable means comprising a solenoid.

17. The circuit breaker assembly defined in claim 11, at least one of said conductors further comprising a surface, extending proximal to the other one of said conductors in said closed position, along which current flows in a substantially opposite direction, said surface being oriented to generate an electromagnetic repulsion between said conductors sufficient to further resist said unintended reciprocation from said closed position to said open position.

18. The circuit breaker assembly defined in claim 11, wherein insulation is positioned adjacent to said surface of at least one of said conductors to prevent direct electrical contact between said surfaces.

19. A circuit breaker assembly positionable in a circuit between a line and a load, said circuit breaker assembly comprising:

a circuit breaker set to open the circuit between said line and said load at or above a predetermined current load;

a contact assembly connected to the load side of said circuit breaker, said contact assembly being adapted to reciprocate between a closed position to permit the flow of current through the circuit and an open position to prevent the flow of current through the circuit, said contact assembly being further adapted to resist unin tended reciprocation from said closed position to said open position at current loads up to at least said predetermined current load, said contact assembly comprising:

(a) a line side conductor having a line side contact;
(b) a load side conductor having a load side contact, said load side conductor being moveable with respect to said line side conductor for reciprocation between said closed position with said line side contact contacting said load side contact and said open position with said line side contact spaced from said load side contact; and
(c) a solenoid connected to at least one of said conductors for reciprocating said conductors between said closed position and said open position;

wherein in said closed position a surface of said line side conductor extends proximal to a surface of said load side conductor, and wherein said current flows in substantially the same direction along said surface of said line side conductor and said surface of said load side conductor, wherein said surfaces are those which extend proximal to each other in said closed position, to generate an electromagnetic attraction between said surfaces;

wherein in said closed position another surface of said line side conductor extends proximal to said load side conductor, wherein said current flows in substantially opposite directions along said another surface of said line side conductor and said load side conductor to generate an electromagnetic repulsion; and wherein said attraction and said repulsion cooperate to resist said unintended reciprocation of said contact assembly from said closed position to said open position.

20. The circuit breaker assembly defined in claim 19, wherein insulation is positioned adjacent to said surface of at least one of said conductors to prevent direct electrical contact between said surfaces.

* * * * *